(12) United States Patent
Hyung

(10) Patent No.: US 9,029,007 B2
(45) Date of Patent: May 12, 2015

(54) RECHARGEABLE BATTERY INCLUDING FIRST AND SECOND METALLIC PLATES COUPLED TOGETHER AND A CAP ASSEMBLY INCLUDING AN INSULATOR

(75) Inventor: Yoo-Eup Hyung, Suwon-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 891 days.

(21) Appl. No.: 12/628,184

(22) Filed: Nov. 30, 2009

(65) Prior Publication Data

US 2010/0255364 A1 Oct. 7, 2010

Related U.S. Application Data

(60) Provisional application No. 61/166,568, filed on Apr. 3, 2009.

(51) Int. Cl.
*H01M 2/00* (2006.01)
*H01M 2/02* (2006.01)
(Continued)

(52) U.S. Cl.
CPC ............ *H01M 2/021* (2013.01); *H01M 2/0212* (2013.01); *H01M 2/0417* (2013.01); *H01M 2/0434* (2013.01); *H01M 2/0482* (2013.01);
(Continued)

(58) Field of Classification Search
CPC . H01M 2/021; H01M 2/0212; H01M 2/0417; H01M 2/362; H01M 2/0482; H01M 2/1235; H01M 2/361; H01M 2/0434
USPC .......................................... 429/163, 181, 185
See application file for complete search history.

(56) References Cited

U.S. PATENT DOCUMENTS

| 3,554,813 A | 1/1971 | Feldhake |
| 4,047,790 A * | 9/1977 | Carino .......................... 439/720 |

(Continued)

FOREIGN PATENT DOCUMENTS

| CN | 1770499 A | 5/2006 |
| CN | 1783570 A | 6/2006 |

(Continued)

OTHER PUBLICATIONS

European Search Report dated Jul. 26, 2010, for corresponding European Patent application 10155157.0, noting listed references in this IDS.

(Continued)

*Primary Examiner* — Gary Harris
(74) *Attorney, Agent, or Firm* — Christie, Parker & Hale, LLP

(57) ABSTRACT

A rechargeable battery configured to prevent or substantially prevent explosion resulting from overheating. In one embodiment, a rechargeable battery includes: a first metallic plate; a second metallic plate coupled to the first metallic plate to together include five sides of a hexahedron and define a cavity and an opening to the cavity being a sixth side of the hexahedron, at least one of the first metallic plate or the second metallic plate including a base and walls extending from at least two opposing peripheral sides of the base; a generation member in the cavity and including at least one connection member at a side of the generation member proximate the opening; and a cap assembly including an insulator and at least one electrode lead coupled to the at least one connection member, the cap assembly closing the opening.

16 Claims, 11 Drawing Sheets

(51) Int. Cl.
*H01M 2/04* (2006.01)
*H01M 2/12* (2006.01)
*H01M 2/36* (2006.01)

(52) U.S. Cl.
CPC ............ *H01M 2/1235* (2013.01); *H01M 2/361* (2013.01); *H01M 2/362* (2013.01)

(56) References Cited

U.S. PATENT DOCUMENTS

| | | | |
|---|---|---|---|
| 6,218,041 | B1 | 4/2001 | Barbier et al. |
| 7,393,610 | B2 * | 7/2008 | Shimamura et al. ......... 429/162 |
| 7,879,477 | B2 | 2/2011 | Seo et al. |
| 2003/0215702 | A1 * | 11/2003 | Tanjou et al. ................. 429/127 |
| 2004/0018425 | A1 * | 1/2004 | Kejha et al. ................... 429/176 |
| 2006/0099501 | A1 | 5/2006 | Kim et al. |
| 2006/0121344 | A1 | 6/2006 | Amagai et al. |

FOREIGN PATENT DOCUMENTS

| | | | |
|---|---|---|---|
| CN | 2904308 | Y | 5/2007 |
| JP | 63-038253 | | 2/1988 |
| JP | 11-47920 | A | 2/1999 |
| JP | 2000-21374 | A | 1/2000 |
| JP | 2004-199991 | | 7/2004 |
| JP | 2006-092884 | | 4/2006 |
| KR | 10-2000-0073090 | A | 12/2000 |
| KR | 10-2001-0045058 | | 6/2001 |
| KR | 2001-0045058 | A | 6/2001 |
| KR | 10-2001-0083562 | | 9/2001 |
| KR | 2001-0083562 | A | 9/2001 |
| KR | 10-2006-0037839 | A | 5/2006 |
| KR | 10-0649218 | B1 | 11/2006 |
| KR | 10-2007-0113039 | A | 11/2007 |
| KR | 10-2008-0069376 | | 7/2008 |

OTHER PUBLICATIONS

Japanese Office action dated Jul. 31, 2012, for corresponding Japanese Patent application 2010-075516, (3 pages).
Patent Abstracts of Japan, and English machine translation of Japanese Publication 2004-199991 listed above, (18, pages).
European Search Report dated Oct. 31, 2011, for corresponding European Patent application 10155157.0, noting references previously submitted in an IDS dated Aug. 20, 2010, 3 pages.
KIPO Office Action dated Nov. 18, 2011 for KR Application No. 10-2010-0006921 (5 pages).
SIPO Office action and English translation for related Application No. 2010-10110436.8 dated Jun. 15, 2012, 7 pages.
SIPO Office action dated Mar. 5, 2013, for corresponding Chinese Patent application 201010110436.8, with English translation, (15 pages).
SIPO Office action dated Aug. 28, 2013, with English translation, corresponding Chinese Patent application 201010110436.8, (14 pages).
SIPO Certificate of Invention Patent, dated Jul. 2, 2014, with English translation of cover page, for corresponding Chinese Patent application 201010110436.8, (19 pages).
Patent Abstracts of Japan, and English machine translation of Japanese Patent 11-47920 dated Feb. 23, 1999, listed above, (8 pages).
SIPO Office action dated Jan. 20, 2014, with English translation, corresponding Chinese Patent application 201010110436.8, (7 pages).

\* cited by examiner

RECHARGEABLE BATTERY INCLUDING FIRST AND SECOND METALLIC PLATES COUPLED TOGETHER AND A CAP ASSEMBLY INCLUDING AN INSULATOR

CROSS-REFERENCE TO RELATED APPLICATION

This application claims priority to and the benefit of U.S. Provisional Patent Application No. 61/166,568 filed on Apr. 3, 2009, the entire content of which is incorporated herein by reference.

BACKGROUND

1. Field

The present invention relates to a rechargeable battery, and more particularly to a rechargeable battery configured to prevent or substantially prevent explosion resulting from overheating, and having a reduced manufacturing cost.

2. Description of the Related Art

A rechargeable battery can be repeatedly charged and discharged, unlike a primary battery which cannot be recharged. A low-capacity rechargeable battery is used for portable small-sized electronic devices, such as mobile phones, notebook computers, and camcorders. A large-capacity battery is widely used as a power source for driving motors, such as for hybrid vehicles.

One type of rechargeable battery is a rechargeable battery using a pouch method of coating polypropylene on an aluminum material in order to close and seal the outside of a generation element. However, the pouch method used by the rechargeable battery has a limit to the molding of the external shape of a pouch because of deformation of aluminum and polypropylene. Accordingly, it is difficult to form a pouch with a thickness of 6 to 7 mm or more. Further, the aluminum material is problematic in that the manufacturing cost is increased because the price of aluminum is relatively high. The aluminum material is also problematic in that it has a danger of explosion when abnormal overheating occurs within a rechargeable battery.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a rechargeable battery having a reduced manufacturing cost, a large thickness, being formed of a metal other than aluminum, and having metal portions thereof closed or coupled by laser welding. Further, embodiments of the present invention provide a rechargeable battery configured to prevent or substantially prevent explosion resulting from overheating of the rechargeable battery.

According to one exemplary embodiment of the present invention, a rechargeable battery includes: a first metallic plate; a second metallic plate coupled to the first metallic plate to together include five sides of a hexahedron and define a cavity and an opening to the cavity being a sixth side of the hexahedron, at least one of the first metallic plate or the second metallic plate including a base and walls extending from at least two opposing peripheral sides of the base; a generation member in the cavity and including at least one connection member at a side of the generation member proximate the opening; and a cap assembly including an insulator and at least one electrode lead coupled to the at least one connection member, the cap assembly closing the opening.

The first and second metallic plates may include steel, stainless steel, or a metal other than aluminum.

The at least one of the first metallic plate or the second metallic plate may include flange portions protruding from respective ones of the walls in at least one direction substantially parallel to a surface of the base. The first and second metallic plates may be fixed to each other at the flange portions via welding or via crimping.

The at least one electrode lead may be mounted on the insulator. The at least one electrode lead may include a plurality of protruding portions, and the insulator may have a plurality of openings receiving the plurality of protruding portions for mounting the at least one electrode lead on the insulator. The insulator may have at least one groove defining at least one recessed surface, the at least one recessed surface contacting the at least one electrode lead and having the plurality of openings therein.

The insulator may be pressed into the opening. The insulator may have at least one side that is tapered along a direction extending toward the cavity. The at least one tapered side of the insulator may be tapered at an angle between about 1 degree and about 10 degrees. The at least one tapered side of the insulator may include two opposing tapered sides.

The cap assembly may be fixed to the first and second metallic plates via at least partial melting of the insulator. The first and second metallic plates may be fixed to each other via a welding process, and the insulator may be at least partially melted via heat from the welding process.

The cap assembly may be fixed to the first and second metallic plates via welding or may be coated with epoxy and fixed to the first and second metallic plates via the epoxy.

The insulator may include a polymer material having a melting temperature between about 100 degrees Celsius and about 130 degrees Celsius. The melting temperature of the polymer material may be about 110 degrees Celsius.

The cap assembly may have an aperture, and the rechargeable battery may further include a plug insertable into the aperture for selectively closing the aperture.

Each of the first and second metallic plates may include a base, walls extending from at least two opposing peripheral sides of the base, and flange portions protruding from respective ones of the walls in at least one direction substantially parallel to a surface of the base.

According to embodiments of the present invention, a rechargeable battery is configured for preventing or substantially preventing explosion of the rechargeable battery resulting from overheating, and the stability of the rechargeable battery can be improved.

Figure 1:
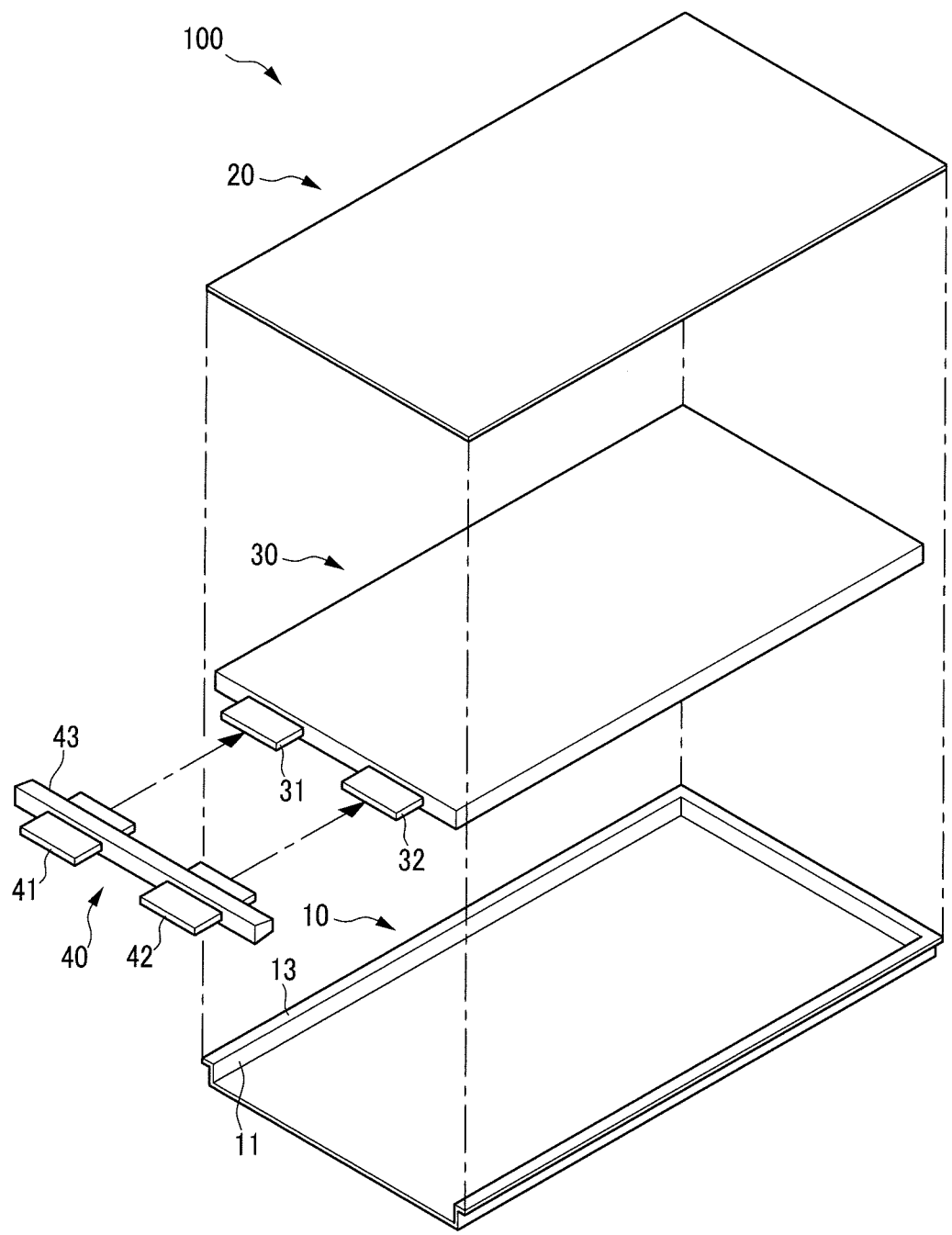
FIG. 1 is an exploded perspective view schematically showing a rechargeable battery according to a first exemplary embodiment of the present invention.

Description of Reference Numerals Indicating Some Elements in the Drawings

| 10 | base member | 11 | lead-in portion |
|----|----|----|----|
| 13 | base flange portion | 20 | cover member |
| 30 | generation member | 31, 32 | connection members |
| 40 | cap assembly | 41, 42 | electrode leads |
| 43 | insulator | 45 | through-hole |

DETAILED DESCRIPTION

A rechargeable battery according to exemplary embodiments of the present invention is described in detail with reference to the accompanying drawings. However, the present invention is not limited to the disclosed embodiments, but may be implemented in various ways. The embodiments are provided to complete the disclosure of the present invention and to allow those having ordinary skill in the art to understand the scope of the present invention. The present invention is defined by the scope of the claims including equivalents thereof. The same reference numbers will be used throughout the drawings to refer to the same or like parts.

One exemplary embodiment of the present invention provides a rechargeable battery including a base member ("first metallic plate"), a cover member ("second metallic plate") coupled to the base member by welding and configured to form a mounting space between the cover member and the base member, a generation member placed in the mounting space, connection members configured to respectively extend from positive and negative electrodes of the generation member, and a cap assembly configured to include electrode leads coupled to the respective connection members and an insulator coupled to the electrode leads and placed between the base member and the cover member.

The cap assembly, in one embodiment, is forcibly inserted between the base member and the cover member. When the base member and the cover member are coupled together by welding, the cap assembly may be coupled between the base member and the cover member through melting.

The cap assembly may be coated with epoxy and coupled between the base member and the cover member. The insulator may be configured to have a tapered shape in a width direction on both sides of a length direction, and may be made of polypropylene material.

A through-hole communicating with the mounting space may be formed in the insulator, and a plug configured to selectively plug the through-hole may be inserted into the through-hole.

The generation member may have a stack form or a jelly roll form. The cover member may have a plate form.

In one embodiment, flange portions may be formed in the base member protruding along the edges of the base member for seating the cover member on the base member.

According to another exemplary embodiment of the present invention, the edges of a cover member are curved in the direction of a base member, and cover flange portions are formed at the curved tips of the cover member. Base flange portions of a base member to which the cover flange portions are coupled may be formed along the edges of the base member.

According to another exemplary embodiment of the present invention, a cap assembly includes a plurality of protrusion portions formed on each electrode lead and extending in a direction toward the insulator. A first face of the insulator in a length direction has a plane, and a face opposite the first face is tapered. Insertion holes into which the respective protrusion portions are inserted are formed on the first face. Accordingly, the insulator is configured to be coupled to the electrode leads.

In one exemplary embodiment, each of the base member and the cover member is made of a metal, and the cover member is coupled to the base member by laser welding. Accordingly, the manufacturing cost can be reduced, and economic efficiency can be improved. Also, since the base member and the cover member are each formed of a metal material, a rechargeable battery of 8 mm or more in thickness can be provided. According to exemplary embodiments of the present invention, the cap assembly is automatically broken when overheating occurs within the rechargeable battery.

Figure 2:
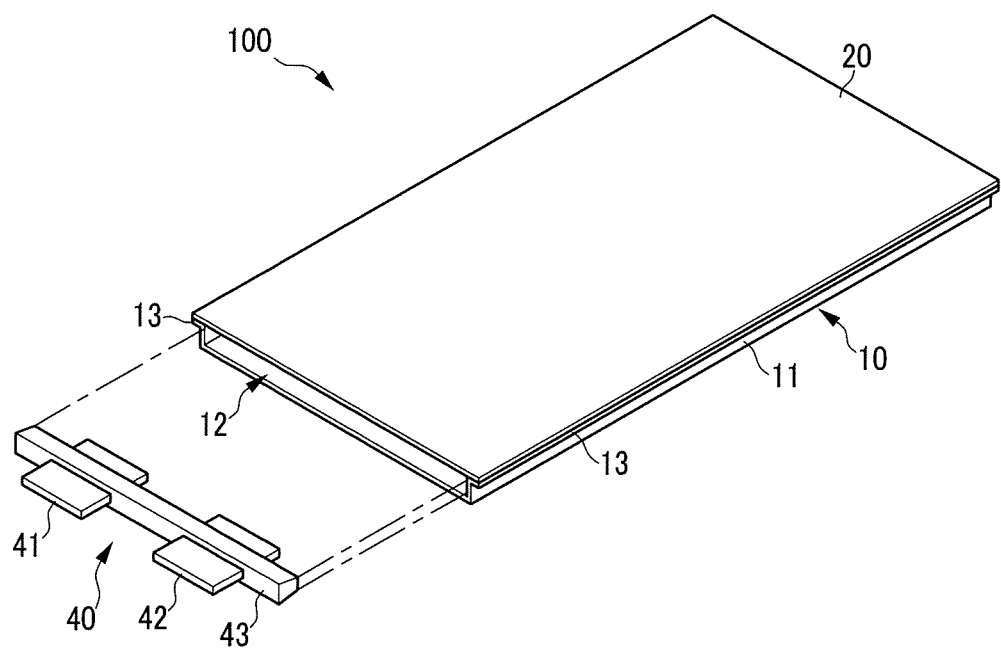
FIG. 2 is a perspective view showing a base member and a cover member of the rechargeable battery of FIG. 1 coupled together, and a cap assembly separated from the base member and the cover member.
Figure 3:
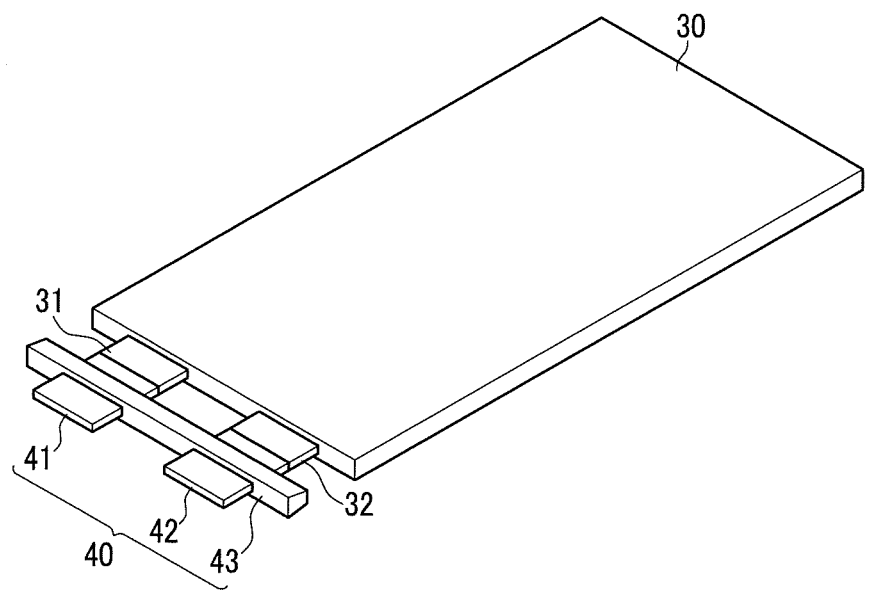
FIG. 3 is a perspective view schematically showing a generation member and a cap assembly of the rechargeable battery of FIG. 1 coupled together.

FIG. 1 is an exploded perspective view schematically showing a rechargeable battery according to a first exemplary embodiment of the present invention. FIG. 2 is a perspective view showing a state in which, when a base member and a cover member of FIG. 1 are coupled together, a cap assembly is separated from the base member and the cover member. FIG. 3 is a perspective view schematically showing a state in which a generation member of FIG. 1 and the cap assembly are coupled together.

As shown in FIGS. 1 to 3, a rechargeable battery 100 according to the first exemplary embodiment of the present invention includes a base member 10 ("first metallic plate"), a cover member 20 ("second metallic plate") welded to the base member 10 and configured to form a mounting space between the cover member 20 and the base member 10, a generation member 30 placed in the mounting space, connection members 31 and 32 configured to respectively extend from the positive and negative electrodes of the generation member 30, and a cap assembly 40. The cap assembly 40 includes electrode leads 41 and 42 coupled to the respective connection members 31 and 32 and an insulator 43 coupled to the electrode leads 41 and 42 and placed between the base member 10 and the cover member 20.

The base member 10 is formed as a polygon having edges, and includes a lead-in portion 11, or wall, between which the generation member 30 is placed. The lead-in portion 11 forms a mounting space between the base member 10 and the cover member 20 coupled thereto, so the generation member 30 can be mounted between the lead-in portions 11. In the exemplary embodiment of the present invention, although the base member 10 is illustrated as having a polygonal shape having edges, the base member 10 may have a shape that does not have edges, such as a round shape. As described above, if the base member 10 has a round shape without edges, the generation member 30 can be mounted on the base member 10 because the lead-in portion 11 is formed within the base member 10.

According to one exemplary embodiment, a base flange portion 13 protruding from edges of the base member 10 is formed on the side of the base member 10. The cover member 20 is mounted on the base flange portion 13. Alternatively, the base member 10 may be formed without the base flange portion 13.

The cover member 20, in one embodiment, is welded to the base member 10. The cover member 20 is configured to have a plate form and is seated over the base member 10, so the cover member 20 and the base member 10 are coupled together along the edges of the base member 10. The mounting space is formed within the base member 10 through the coupling of the cover member 20 and the base member 10. Accordingly, the generation member 30 can be placed within the mounting space. The welding of the cover member 20 and the base member 10 may include arc welding, gas welding, or laser welding. However, the present invention may selectively use the arc welding, gas welding, and laser welding, as well as a combination thereof, rather than being limited to one of them.

The base member 10 and the cover member 20, in one embodiment, are made of a steel material or a stainless steel material. According to some exemplary embodiment, the cover member 20 and the base member 10 are coupled by welding and are formed of a metal other than aluminum, and the manufacturing cost can thereby be reduced. A variety of metal materials may be used in the rechargeable battery according to the present exemplary embodiment. Accordingly, inexpensive metal materials can be used and the manufacturing cost can be reduced. It is illustrated that the cover member 20 and the base member 10 according to one exemplary embodiment of the present invention are coupled by welding. However, in another exemplary embodiment, they may be coupled through a crimping process.

The generation member 30 is placed in the mounting space formed by the coupling of the cover member 20 and the base member 10.

In an exemplary embodiment of the present invention, the generation member 30 may be placed in the mounting space in a stack form or a jelly roll form. The generation member of a stack form or a jelly roll form is known, so construction and a detailed description thereof are omitted in the exemplary embodiment of the present invention. The connection members 31 and 32 are configured to protrude from one side of the generation member 30 and extend from the respective positive and negative electrodes of the generation member 30. The cap assembly 40 is coupled to the connection members 31 and 32.

Figure 4:
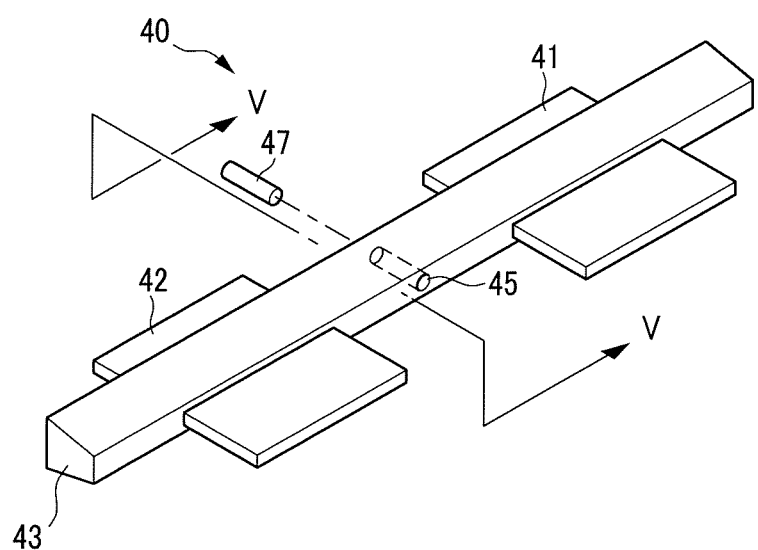
FIG. 4 is a perspective view showing electrode leads and an insulator of the cap assembly of the rechargeable battery of FIG. 1 coupled together.
Figure 5:
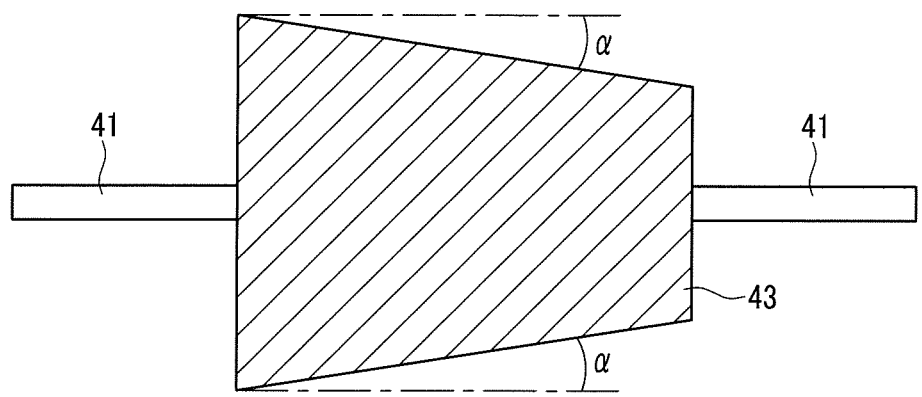
FIG. 5 is a sectional diagram taken along line V-V of FIG. 4.

FIG. 4 is a perspective view showing a state in which the electrode leads of the cap assembly and the insulator are coupled together, and FIG. 5 is a sectional diagram taken along line V-V of FIG. 4.

As shown in FIGS. 4 and 5, the cap assembly 40 includes the electrode leads 41 and 42 coupled to the respective connection members 31 and 32 (refer to FIGS. 1 and 3) and the insulator 43 coupled to the electrode leads 41 and 42 and placed between the base member 10 and the cover member 20.

The electrode leads 41 and 42 may be coupled to the respective connection members 31 and 32 by welding. The electrode leads 41 and 42 may be coupled to the connection members 31 and 32 through the insulator 43. A pair of the electrode leads 41 and 42 are coupled to the negative and positive electrodes via the connection members 31 and 32.

The insulator 43 is configured to support the electrode leads 41 and 42, and is coupled to a side of the rechargeable battery 100 having an opening portion 12 (see FIG. 2) formed in the side between where the base member 10 and the cover member 20 are coupled together. The lead-in portion 11 and the base flange portion 13 are not formed at the side of the base member 10 where the opening portion 12 is formed.

The insulator 43, in one exemplary embodiment, is forcibly fit into the opening portion 12. To this end, the insulator 43 has a larger size than that of the opening of the opening portion 12. In one embodiment, the insulator 43 is formed to have a polygonal shape having edges, and the side of the insulator 43 in a width direction may be tapered. The tapering faces of the insulator 43 may be formed in the width direction thereof on the top and bottom of the length direction. With reference to FIG. 5, a taper angle ($\alpha$) of the insulator 43 may be between about 1° and about 10°. If the taper angle of the insulator 43 is less than 1°, fitting pressure in the opening portion 12 is very low. If the taper angle of the insulator 43 is greater than 10°, pressure is excessively applied between the opening portion 12 and the insulator 43. Accordingly, the taper angle of the insulator 43 is formed to be between about 1° and about 10° so that the insulator 43 can be forcibly fit into the opening portion 12 without excessive pressure. Further, the insulator 43, in one exemplary embodiment, is made of a polypropylene material.

The insulator 43 may be made of a polypropylene material because when the insulator 43 is forcibly fit into the opening portion 12, as described above, it prevents or substantially prevents the rechargeable battery 100 from exploding. In more detail, polypropylene has a property that it is easily melted at 110° C. or more. Thus, when the temperature rises because of an abnormality of the rechargeable battery 100, the insulator 43 melts, thereby opening a portion of the opening portion 12 of the rechargeable battery 100. Consequently, since the opening portion 12 is opened, pressure within the rechargeable battery 100 drops. Accordingly, unexpected explosion can be prevented, and a structure with improved stability can be provided. Alternatively, in other exemplary embodiments of the present invention, the material of the insulator 43 is not limited to polypropylene and may include a polymer material that melts at a temperature between about 100° C. and about 130° C., such as a temperature near 110° C.

When the insulator 43 is mounted, epoxy (not shown) may be used as an assistant mounting medium. The cap assembly 40 constructed with the epoxy, when the cover member 20 and the base member 10 are coupled together by welding, may be forcibly fit into the opening 12 and coupled together through thermal compression. That is, the epoxy and the insulator 43 may be partially melted and thermally compressed by heating a portion where the cap assembly 40 contacts the cover member 20 and the base member 10 from outside while the cap assembly 40 is press-fit into the opening portion 12.

Further, a through-hole 45 may be formed in the insulator 43 such that it faces the generation member 30. The through-hole 45 may be formed in order to inject an electrolytic into the rechargeable battery. A plug member 47 functions to selectively open or shut the through-hole 45 and may be inserted into the through-hole 45. One or more through-holes 45 may be formed in the length direction of the insulator 43.

If gas is generated within the rechargeable battery when the rechargeable battery 100 is charged or discharged, the plug member 47 opens the through-hole 45 so that the gas within the rechargeable battery can be discharged. Further, a vent (not shown) may be formed in the through-hole 45 so that gas can be easily discharged through the vent.

As described above, in the rechargeable battery 100 according to one exemplary embodiment, the cover member 20 is made of a metal material, and the base member 10 and the cover member 20 are coupled together by welding. Accordingly, a rechargeable battery of 8 mm or more in thickness can be provided.

The operation of the rechargeable battery 100 constructed according to one exemplary embodiment is described below.

First, the cover member 20 is welded to the base member 10. The generation member 30 is placed in the space between the base member 10 and the cover member 20. Since the base member 10 and the cover member 20 are coupled together via welding, the rechargeable battery 100 can be formed at a thickness of 8 mm or more.

Here, the opening portion 12 is formed on the side of the base member 10 and the cover member 20, and the cap assembly 40 is forcibly fit into the opening portion 12 and coupled thereto during the welding process. If the temperature of the rechargeable battery increases excessively, the insulator 43 melts, thereby opening the opening portion 12. Accordingly, the explosion of the rechargeable battery can be prevented.

An electrolytic solution is supplied through the through-hole 45 formed in the insulator 43 of the cap assembly 40. The plug member 47 may be inserted into the through-hole 45 for selectively plugging the through-hole 45.

As described above, the rechargeable battery according to exemplary embodiments of the present invention has a thickness of 8 mm or more and is configured having a structure that is capable of preventing or substantially preventing explosion when the pressure therein is abnormal.

Figure 6:
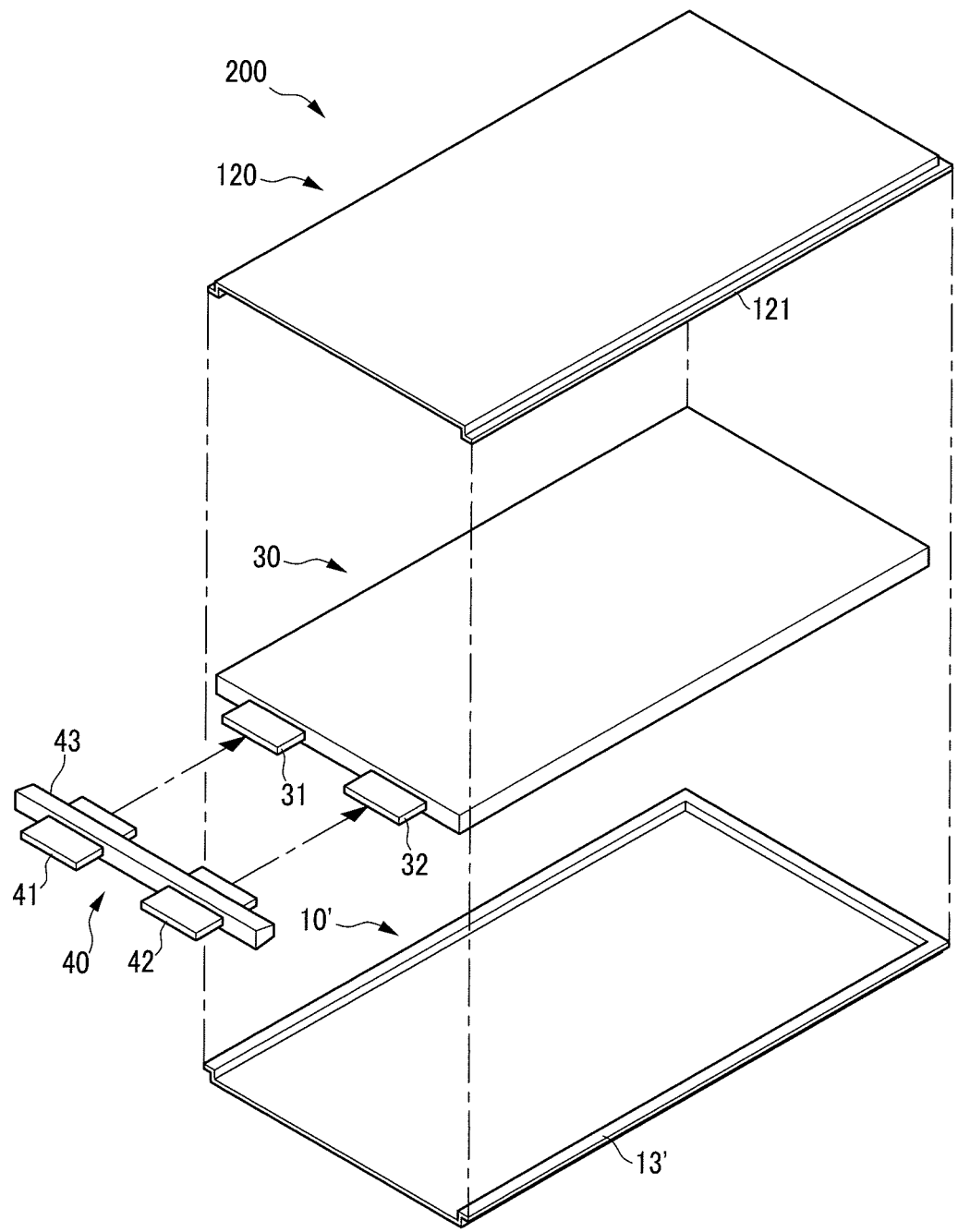
FIG. 6 is an exploded perspective view schematically showing a rechargeable battery according to a second exemplary embodiment of the present invention.

FIG. 6 is an exploded perspective view schematically showing a rechargeable battery 200 according to another exemplary embodiment of the present invention. The same reference numerals as those of FIGS. 1 to 5 are used to identify the same members having the same functions. Hereinafter, a detailed description of the same reference numerals is omitted.

As shown in FIG. 6, cover flange portions 121 are formed on the sides of a cover member 120. The cover flange portions 121 are formed along the edges of the cover member 120. The cover flange portions 121 are configured to adjoin a base flange portion 13' of a base member 10' and are coupled to the base flange portion 13' by welding. The cover member 120 may include lead-in portions, or walls, from which the cover flange portions 121 extend (as depicted in FIG. 6), or in an alternative embodiment, may include lead-in portions but not the cover flange portions 121.

Figure 7:
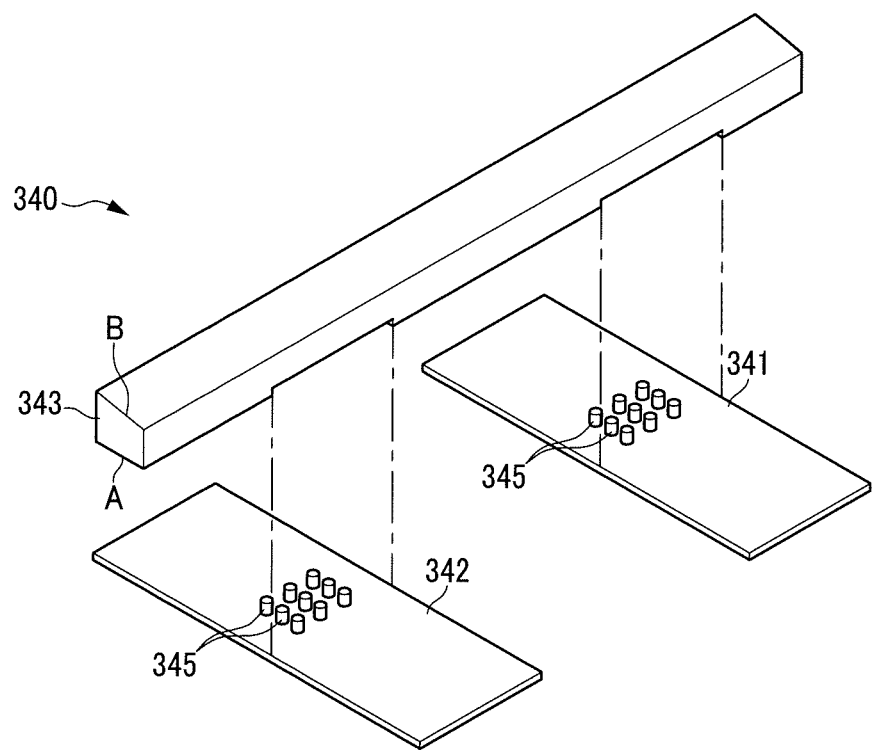
FIG. 7 is an exploded perspective view showing a cap assembly of a rechargeable battery according to a third exemplary embodiment of the present invention.
Figure 8:
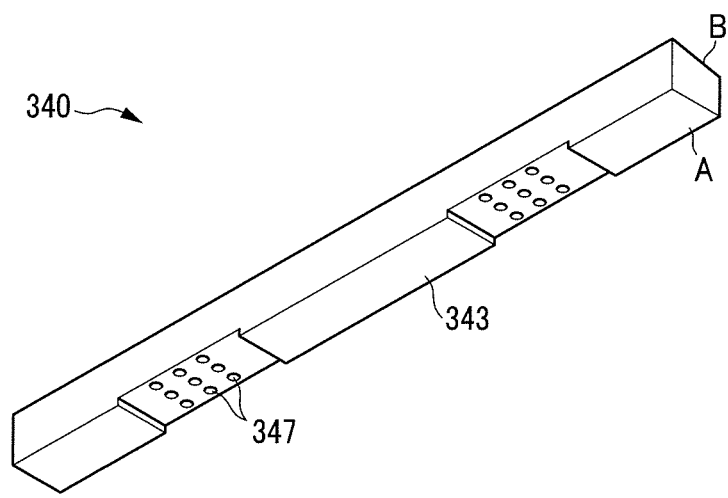
FIG. 8 is a bottom perspective view of an insulator of the cap assembly of FIG. 7.

FIG. 7 is an exploded perspective view showing a cap assembly of a rechargeable battery according to another exemplary embodiment of the present invention, and FIG. 8 is a perspective view showing a face in which insertion holes of an insulator of the cap assembly of FIG. 7 are formed.

The same reference numerals as those of FIGS. 1 to 5 are used to identify the same members having the same functions. Hereinafter, a detailed description of the same reference numerals is omitted.

As shown in FIGS. 7 and 8, a cap assembly 340 of a rechargeable battery according to another exemplary embodiment of the present invention includes a plurality of protrusion portions 345 formed on each of electrode leads 341. Insertion holes 347 into which the respective protrusion portions 345 are inserted are formed in an insulator 343. Accordingly, the electrode leads 341 and 342 and the insulator 343 may be coupled together by forcibly inserting the protrusion portions 345 into the respective insertion holes 347.

In one embodiment, one face A of the insulator 343 in which the insertion holes 347 are formed is flat, and the other face B opposite to the face A is tapered. Accordingly, the electrode leads 341 may be coupled to the insulator 343, and the insulator 343 may be easily fit into the opening portion 12.

Figure 9:
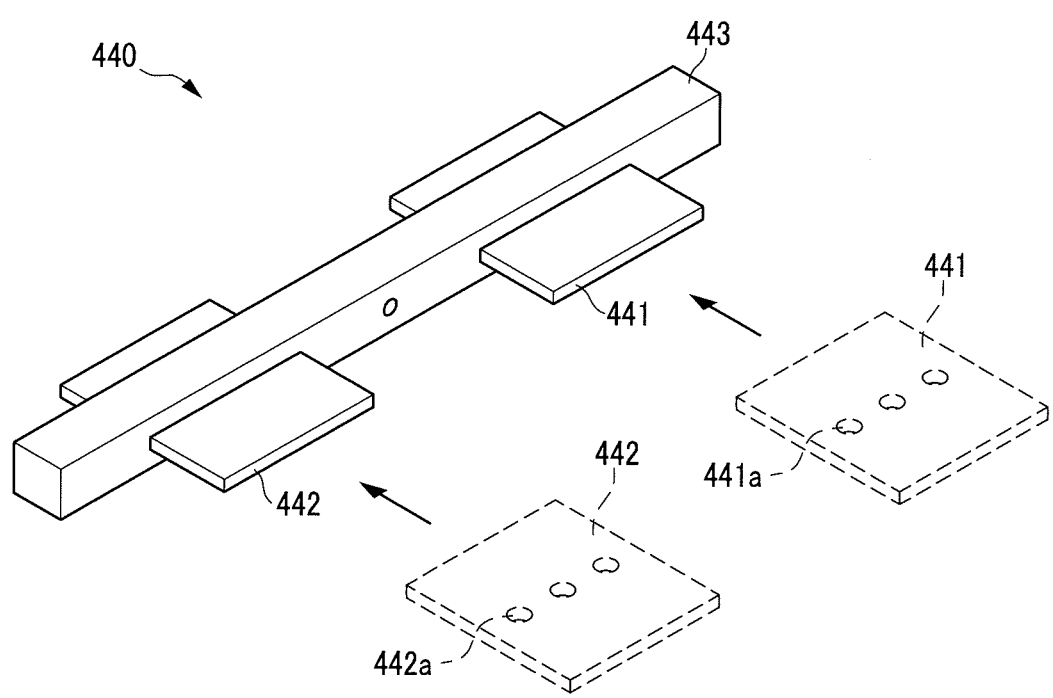
FIG. 9 is a perspective view showing a cap assembly of a rechargeable battery according to a fourth exemplary embodiment of the present invention.

FIG. 9 is a perspective view showing an assembled state of electrode leads and an insulator of a cap assembly 440 of a rechargeable battery according to another exemplary embodiment of the present invention.

Referring to FIG. 9, the cap assembly 440 is formed by coupling electrode leads 441 and 442 with an insulator 443, and at least one hole 441a and 442a is formed on each of the respective electrode leads 441 and 442. Each of the holes 441a and 442a may be formed as a through hole or a recess, and may improve coupling adhesion when the electrode leads 441 and 442 are coupled to the insulator 443 by providing an increase of friction at the hole 441a and 442a between the electrode leads 441 and 442 and the insulator 443.

Figure 10:
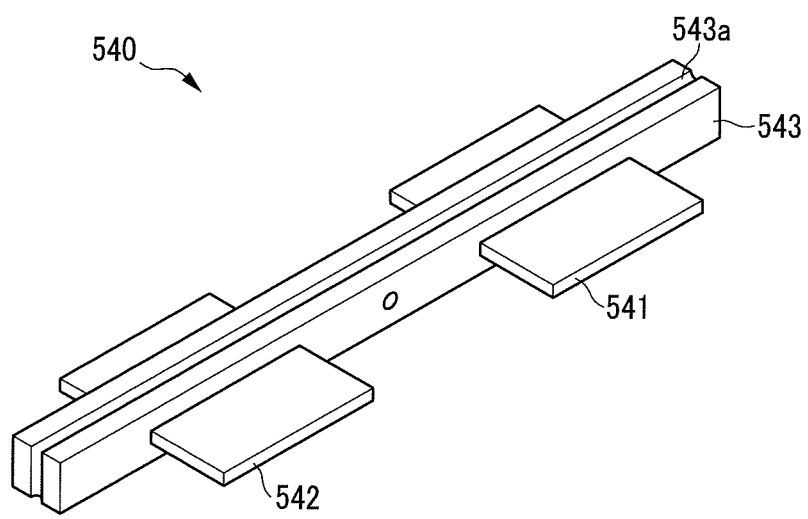
FIG. 10 is a perspective view showing a cap assembly of a rechargeable battery according to a fifth exemplary embodiment of the present invention.

FIG. 10 is a perspective view showing an assembled state of electrode leads and an insulator of a cap assembly 540 of a rechargeable battery according to another exemplary embodiment of the present invention.

Referring to FIG. 10, the cap assembly 540 is formed by coupling electrode leads 541 and 542 with an insulator 543, and a groove 543a is formed along the periphery of the insulator 543 which contacts a base member and a cover member of the rechargeable battery near an opening to a cavity therebetween to improve sealing of the opening. Two or more grooves 543a may be formed in parallel, which may further improve a sealing capability of the cap assembly 540.

Figure 11:
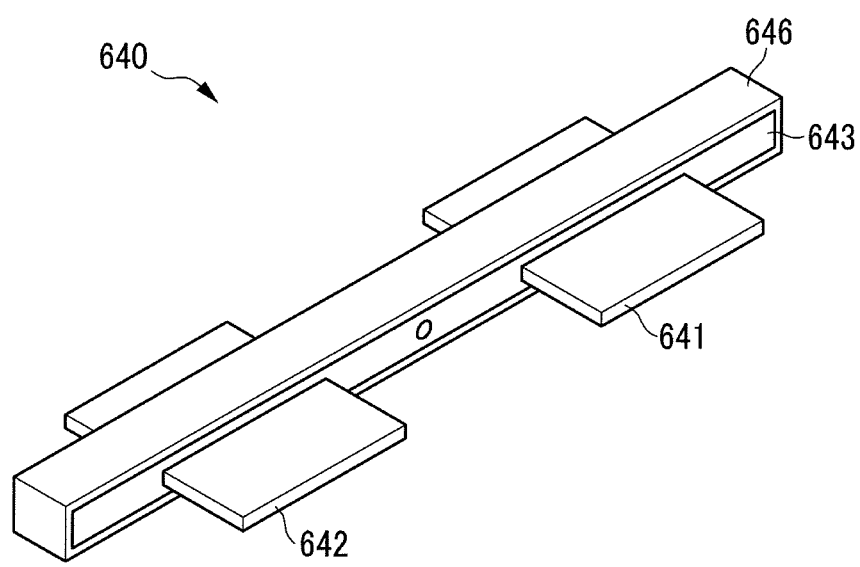
FIG. 11 is a perspective view showing a cap assembly of a rechargeable battery according to a sixth exemplary embodiment of the present invention.

FIG. 11 is a perspective view showing an assembled state of electrode leads and an insulator of a cap assembly 640 of a rechargeable battery according to another exemplary embodiment of the present invention.

Referring to FIG. 11, the cap assembly 640 is formed by coupling electrode leads 641 and 642 with an insulator 643, and the insulator 643 is covered with a metallic case 646 along the periphery of the insulator 643 which contacts a base member and a cover member of the rechargeable battery. The insulator 643 covered with the metallic case 646 may be coupled to the base member and the cover member by welding.

The exemplary embodiments of the present invention have been described above with reference to the accompanying drawings. However, the present invention is not limited to the exemplary embodiments, but may be modified in various ways by those having ordinary skill in the art. Accordingly, the scope of the present invention should be defined by the claims.

What is claimed is:

1. A rechargeable battery comprising: a first metallic plate; a second metallic plate coupled to the first metallic plate together comprising five sides of a hexahedron and defining a cavity and an opening to the cavity being a sixth side of the hexahedron, the opening being defined between edges of parallel surfaces of at least two opposing sides of the hexahedron, at least one of the first metallic plate or the second metallic plate comprising a base and walls extending from at least two opposing peripheral sides of the base, and flange portions protruding from respective ones of the walls in at least one direction substantially parallel to a surface of the base; a generation member in the cavity and comprising at least one connection member at a side of the generation member proximate the opening; and a cap assembly comprising an insulator and at least one electrode lead coupled to the at least one connection member, the cap assembly closing the opening, wherein the insulator has a larger size than that of the opening and is forcibly fit into the opening, and the insulator has at least one side that is tapered relative to a respective surface of the parallel surfaces at an angle between about 1 degree and about 10 degrees along a direction extending toward the cavity, the at least one tapered side of the insulator being at a side of the opening corresponding to the edge of the respective surface of the parallel surfaces.

2. The rechargeable battery of claim 1, wherein the first and second metallic plates comprise steel, stainless steel, or a metal other than aluminum.

3. The rechargeable battery of claim 1, wherein the first and second metallic plates are fixed to each other at the flange portions via welding.

4. The rechargeable battery of claim 1, wherein the first and second metallic plates are fixed to each other at the flange portions via crimping.

5. The rechargeable battery of claim 1, wherein the at least one electrode lead is mounted on the insulator.

6. The rechargeable battery of claim 5, wherein the at least one electrode lead composes a plurality of protruding portions, and the insulator has a plurality of openings receiving the plurality of protruding portions for mounting the at least one electrode lead on the insulator.

7. The rechargeable battery of claim 6, wherein the insulator has at least one groove defining at least one recessed surface, the at least one recessed surface contacting the at least one electrode lead and having the plurality of openings therein.

8. The rechargeable battery of claim 1, wherein the at least one tapered side of the insulator comprises two opposing tapered sides.

9. The rechargeable battery of claim 1, wherein the cap assembly is fixed to the first and second metallic plates via at least partial melting of the insulator.

10. The rechargeable battery of claim 9, wherein the first and second metallic plates are fixed to each other via a welding process, and the insulator is at least partially melted via heat from the welding process.

11. The rechargeable battery of claim 1, wherein the cap assembly is fixed to the first and second metallic plates via welding.

12. The rechargeable battery of claim 1, wherein the cap assembly is coated with epoxy and fixed to the first and second metallic plates via the epoxy.

13. The rechargeable battery of claim 1, wherein the insulator comprises a polymer material having a melting temperature between about 100 degrees Celsius and about 130 degrees Celsius.

14. The rechargeable battery of claim 13, wherein the melting temperature of the polymer material is about 110 degrees Celsius.

15. The rechargeable battery of claim 1, wherein the cap assembly has an aperture, and the rechargeable battery further comprises a plug insertable into the aperture for selectively closing the aperture.

16. The rechargeable battery of claim 1, wherein each of the first and second metallic plates comprises a base, walls extending from at least two opposing, peripheral sides of the base, and flange portions protruding from respective ones of the walls in at least one direction substantially parallel to a surface of the base.

* * * * *